3,650,994
POLYURETHANE COMPOSITIONS PREPARED FROM DIPHENYL ETHER-PHENOL RESINS AND POLYISOCYANATES
Llewellyn Delphin Booth, Lake Jackson, Tex., assignor to The Dow Chemical Company, Midland, Mich.
No Drawing. Continuation-in-part of application Ser. No. 781,258, Dec. 4, 1968. This application July 27, 1970, Ser. No. 58,747
Int. Cl. C08g 22/44, 22/18
U.S. Cl. 260—2.5 AM
2 Claims

ABSTRACT OF THE DISCLOSURE

The invention concerns polyurethane compositions derived from chloromethylated diphenyl ether-phenol resins and polyisocyanates. It relates more particularly to polyurethane foams of synthetic chloromethylated diphenyl ether-phenol resins and polyisocyanates. The foams are fire retardant and have improved physical properties.

---

This application is a continuation-in-part of my application Ser. No. 781,258, filed Dec. 4, 1968 now abandoned.

The invention concerns polyurethane compositions derived from diphenyl ether-phenol resins and polyisocyanates. It relates more particularly to polyurethane foams of synthetic diphenyl ether-phenol resins and polyisocyanates.

It is known to prepare polyurethane compositions, particularly polyurethane foams, from polyisocyanates and oxyalkylated derivatives of phenol-aldehyde resins, e.g., novolac polyols, alone, or in admixture with other organic compounds containing at least two active hydrogen containing groups such as polyether polyols or polyesters.

The polyurethane compositions, especially the rigid foams have many desirable properties. They have great structural strength. In sandwich-type constructions they exhibit a high degree of rigidity, a property particularly suitable for building purposes. Because of the closed cell, or substantially closed cell, structure, they are excellent heat and sound insulators.

Because of the many advantages of the polyurethane foams, industry is constantly searching for better components for use in the foam compositions, that have the advantages of lower cost, or that will improve the foam properties, or enhance the resistance to burning, or render it self-extinguishing or non-burning.

It has now been discovered that polyurethane compositions prepared from diphenyl ether-phenol resins, in whole or in part, as the organic compound containing at least two active hydrogen containing groups as determined by the Zerewitinoff method, which are reacted with an organic polyisocyanate, not only possess improved physical properties, but that the phenol-diphenyl ether resin has a surprising action of rendering the compositions flame resistant, fire retardant, self-extinguishing and substantially non-burning.

The diphenyl ether-phenol resins to be employed in the invention are polynuclear compounds prepared by the reaction of a chloromethylated diphenyl ether having the formula:

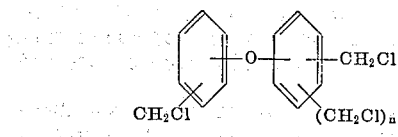

wherein $n$ is an integer from 0 to 1 and a phenol having at least one hydrogen atom in the ortho or para position and the general formula:

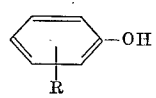

wherein R is hydrogen, chlorine, bromine, cyclohexyl, phenyl, or an akyl radical having from 1 to 12 carbon atoms.

Among suitable phenols are phenol, or an ortho or para unsubstituted derivative thereof such as cresol, xylenol, resorcinol, chlorophenol, bromophenol, isopropylphenol, tert-butylphenol, octylphenol, nonyl-phenol, and dodecylphenol. The phenol is reacted with the chloro methylated diphenyl ether at reaction temperatures between about 60 to 200° C., employing procedure described in Examples 1, 2, 3, 7, 8 and 9 of U.S. Pat. No. 3,128,259.

The diphenyl ether-phenol resins have molecular weights between about 450 and 1500 and contain from about 6 to about 10 percent by weight phenolic OH groups.

The diphenyl ether-phenol resins are fusible organic solvent soluble solids, and as previously stated can be used in whole, or in part, as the hydroxyl-containing organic compound to react with an organic polyisocyanate to form polyurethane compositions possessing improved physical properties and self-extinguishing characteristics.

The diphenyl ether-phenol resins can be employed as the sole hydroxyl-containing compound or they can be used in admixture, or blended with, polyether polyols such as the adducts of one or more alkylene oxides having from 2 to 4 carbon atoms such as ethylene oxide, propylene oxide, or butylene oxide, with glycols, glycerol, 1,2,4-butanetriol, 1,2,6-hexanetriol, trimethylolpropane, pentaerythritol, sucrose, hexose, or sorbitol, or with polyols that are adducts of said alkylene oxides and novolac resins, e.g., novolac polyols, which polyols have hydroxyl numbers in the range of from about 30 to 1200. The novolac resins can also be blended or mixed with polyesters containing hydroxyl groups reactive with organic polyisocyanates to form polyester resin polyurethane compositions. In all such blends or mixtures the diphenyl ether-phenol resin is preferably used in amount sufficient to provide at least 50 percent of the total reactive OH groups in the mixture.

Any organic aryl polyisocyanate can be employed in making the polyurethane compositions of the present invention. The isocyanate may contain two or more isocyanate radicals. Mixtures of the aryl polyisocyanates can be employed.

Representative polyisocyanate compounds are:

toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4-diisocyanatodiphenylether,
5,6-dimethyl-1,3-phenylenediisocyanate,
2,4-dimethyl-1,3-phenylenediisocyanate,
4,4-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6'-dimethyl-4,4'-diisocyanatodiphenyl,
2,4-diisocyanatostilbene, 3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates are the polyisocyanates described in Canadian Pat. No. 700,026 and in U.S. Pat. No. 2,683,730; the phenyl indane diisocyanates which are described in U.S. Pat. No. 2,855,385, the organic diisocyanates which are described in U.S. Pat. No. 2,292,443; and the organic triisocyanates which are described in U.S. Pat. No. 2,292,443; and the organic triisocyanates which are described in U.S. Pat. No. 2,292,443; and the organic triisocyanates which are described in U.S. Pat. No. 2,929,794.

The organic polyisocyanate compounds which can be used also include the isocyanate-terminated reaction products of a molar excess of any of the above described polyisocyanates with the polyhydroxy compounds described.

It may be mentioned that the polyurethane foams prepared from the blends of said resins with diphenyl ether-phenol resins and other polyols described herein and polymeric isocyanates such as polymethylene polyphenyl isocyanate (PAPI) possess superior resistance to burning and self-extinguishing characteristics than have foams made with the non-polymeric isocyanates, e.g. tolylene diisocyanate, under otherwise similar conditions. The polyurethane foams prepared from the diphenyl ether-phenol resins and polymeric polyisocyanates are a preferred class of product of the invention.

In making the polyurethane foams of the invention, the proportions of the polyisocyanate compounds and the proportions of the diphenyl ether-phenol resin, or of said resin and the polyols or other compounds having active hydrogen atoms, can vary widely, but are usually employed in amounts corresponding to from about 0.9 to 2.0, preferably from 1.0 to 1.2 NCO group per active hydrogen atom in the mixture. One can provide water and excess polyisocyanate to form gases capable of expanding the reaction mass to make a foam. However, the polyurethane foams are preferably prepared employing aliphatic hydrocarbons boiling below 110° C. or halogenated aliphatic hydrocarbons boiling below 110° C. such as dichlorodifluoromethane, trichlorofluoromethane, hexane, hexene, heptane, petroleum ether, or pentane as the blowing or foaming agent. Suitable foaming agents are disclosed in U.S. Pat. No. 3,072,582.

The polyisocyanates are usually employed in an amount in excess of that theoretically required to react with the hydrogen atoms in the sum of the reactants and water in the mixture of materials, preferably in an amount corresponding to from about 1.0 to 1.2 NCO group for each OH and active hydrogen atom in the starting materials.

The polyurethane foams can be prepared by a prepolymer procedure, a one-shot process, or a batch-wise technique, all of which methods are known to the art. The products are rigid to semi-rigid foams and have closed or open cells, but usually consist of predominantly closed cells with a minor amount of open or interconnected cells.

In practice, the diphenyl ether-phenol resin or a mixture of said resin and one or more polyols or polyesters as hereinbefore described is reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CH_2CCl_2$, $CCl_3F$, $CCl_2F_2$, $C_2Cl_2F_2$, $CH_2Cl_2$, $C_2H_4Cl_2$, $CHCl_2F$, $CClF_3$, and $CHClF_2$, or pentane, pentene, hexane, hexene and heptane.

Among suitable catalysts are sodium acetate; amine catalysts such as tetramethylenediamine (TMDA), tetramethyl guanidine (TMG), triethylamine (TEA), tetramethyl-1,1,3,3-butanediamine (TMBA), tetramethylethylenediamine (TMEDA), triethylenediamine ("DABCO"), dimethylethanolamine, N-ethyl morpholine, and N-ethyl piperidine; and esters of tin, or tin salts, such as stannous oleate, stannous octoate, and dibutyl tin dilaurate. Mixtures or combinations of any two or more of the catalysts can also be used.

The catalysts can be used in amounts corresponding to from about 0.01 to 5 percent based on the total weight of the sum of the weights of the polyols initially used.

Among surface active agents or emulsifiers there may be mentioned, polypropylene glycols having molecular weights between 2000 and 8000, the liquid silicone-glycol copolymers having viscosities of from 350 to 3500 centistokes at 77° F., and polysiloxane polyoxyalkylene block copolymers as described in U.S. Pat. No. 2,834,748.

The following example illustrates a way in which the principle of the invention has been applied, but is not to be construed as limiting its scope.

EXAMPLE 1

A diphenyl ether-phenol modified resin was prepared by reacting 400 grams (4.26 moles) of phenol with 233 grams (0.386 equivalents of $CH_2Cl$/mole of phenol) of a mixture containing 68.5 wt. percent 4,4'-bis(chloromethyl) diphenyl oxide, 17.7 wt. percent 2,4'-bis(chloromethyl) diphenyl oxide, 11.2 wt. percent 2,4,4'-tris-(chloromethyl) diphenyl oxide, 2.35 wt. percent 4-chloromethyl diphenyl oxide and 0.25% 2-chloromethyldiphenyl oxide at 95°–100° C. for about 2 hours. The excess phenol was removed from the diphenyl ether-polyol resin at 175–180° C. at 2 cm. Hg. The product had a percent OH of 9.02 and a molecular weight of about 480.

A polyurethane foam was prepared from the above prepared diphenyl ether-phenol modified resin and a polyisocyanate employing the recipe:

| Ingredient: | Parts by weight |
|---|---|
| Diphenyl ether-phenol resin | 44.6 |
| Polymethylene polyphenyl isocyanate (Kaiser NCO-20) [1] | 30.4 |
| Silicone surfactant | 1.5 |
| Triethylphosphate | 11.25 |
| Trichlorofluoromethane | 15.0 |
| Sodium acetate (catalyst) | 2.5 |

[1] The Kaiser NCO-20 polyisocyanate has a functionality of 2.6, an NCO equivalent weight of 132–135, and a percent NCO by weight of 31–32.

The ingredients were blended together in a Waring Blendor for about 10 seconds. The mixture was poured into a paper cup mold and was allowed to foam. The foam product was composed of uniform fine cells of which 95% were interconnected or open cells. The foam had a density of 2.24 lbs./cu. ft. and was self-extinguishing by ASTM D1692–59T test.

EXAMPLE 2

To demonstrate that the unique fire retardant properties exhibited by the compositions of the present invention are not attributable to an added fire retardant agent, two polyurethane foams were prepared in an identical manner, except that one, Foam #1, employed triethylphosphate (a known fire retardant agent) as the diluent for the diphenyloxide modified novolac resin employed as the polyol, whereas the other foam, Foam #2, employed dimethylformamide (not known to be a fire retardant additive) as the diluent.

The foams were prepared by mixing together all the ingredients except the isocyanate and thereafter blending the isocyanate into the mixture. This mixture was then poured into an open container and allowed to rise freely. The receipe for the foams were as follows:

| Foam | #1, grams | #2, grams |
|---|---|---|
| PAPI isocyanate [1] | 427 | 427 |
| Diphenyloxide modified novolac [2] | 373 | 373 |
| Silicone oil | 8 | 8 |
| Chlorotrifluoromethane | 160 | 160 |
| Triethylphosphate | 100 | |
| Dimethylformamide | | 80 |
| Tetramethylbutylene diamine | 2.0 | 2.25 |

[1] PAPI is a polymethylene polyphenylisocyanate having an average isocyanate functionality of about 2.6 and an isocyanate equivalent weight of 134.
[2] The diphenyl oxide modified novolac is the reaction product of an oxide mixture of chlormethylated diphenyloxides comprised of 68.5 weight percent 4,4'-bis(chloromethyl)diphenyl oxide, 17.7 weight percent 2,4'-bis(chloromethyl)diphenyl oxide, 11.2 weight percent 2,4,4'-tris(chloromethyl)diphenyl oxide, 2.35 weight percent 4-chloromethyl diphenyl oxide and 0.25 weight percent 2-chloromethyl diphenyl oxide with phenol and having a molecular weight of about 480 and a percent OH of about 9.02.

The properties of the above prepared polyurethane foams were as follows:

| Foam | #1 | #2 |
|---|---|---|
| Density, lbs./ft.$^3$ | 2.04 | 1.94 |
| MVT, per-inches | 2.36 | 2.02 |
| Compression yield, p.s.i. | [1] 34.4 | [2] 29.5 |
| ASTM 1692-67T burn test | [3] S.E. | [4] S.E. |
| Bureau of Mines Burn Through Test No. 6366, min | >30 | >30 |
| "K" factor, original | 0.111 | 0.111 |
| "K" factor after 10 day dry age at 140° F | 0.147 | 0.138 |
| Abrasion, ASTMC-421-61, percent weight loss | 1.9 | <1.0 |

[1] At 7.1% deflection.
[2] At 5.6% deflection.
[3] 0.6 in. in 60 seconds.
[4] 1.1 in. in 60 seconds.

The above data indicates that the unique foam properties of the foams of the present invention are not due to the addition of a known fire retardant agent.

EXAMPLE 3

To demonstrate that the unique fire retardant properties exhibited by the foam compositions of the present invention are not attributable to the isocyanae employed, 3 foams were prepared in an identical manner and formulation except that one, Foam #1, employed the polyol of the present invention, another employed a 3.5 functional novolac resin oxyalkylated with 1 mole of propylene oxide per OH employing an NCO/OH ratio identical to that of Foam #1 and the other, Foam #3, employing the same polyol as Foam #2 except that the polyol and isocyanate weights were the same as in Foam #1.

The foam recipes and properties of the foams are as follows.

| Recipe | Foam #1 | Foam #2 | Foam #3 |
|---|---|---|---|
| Polyol, grams/OH equivalent | [1] 373/2.19 | [2] 438.7/2.58 | [2] 373/2.19 |
| Isocyanate, PAPI®,[3] grams/NCO equivalent | 427/3.17 | 361.3/269 | 427/3.17 |
| Silicone oil, grams | 8 | 8 | 8 |
| Triethylphosphate, grams | 100.0 | 100.0 | 100.0 |
| Tetramethylbutanediamine | 2.0 | 2.0 | 2.0 |
| Chlorotrifluoromethane | 160.0 | 160.0 | 160.0 |
| Physical properties: | | | |
| Density, lbs./ft.$^3$ | 2.04 | 1.85 | 1.64 |
| Moisture vapor transmission, per inches | 2.36 | 3.92 | 3.91 |
| Compressive yield strength, lbs./in.$^2$ | 34.4 | 21.6 | 18.8 |
| K factor, original | 0.111 | 0.127 | 0.141 |
| Abrasion, percent weight loss | 1.9 | 4.0 | 3.3 |
| Fire retardance, ASTM D-1692-67 burn test | S.E., 0.6 in. in 60 seconds. | S.E., 0.45 in. in 60 seconds. | S.E., 0.35 in. in 60 seconds. |
| Fire retardancy, Bureau of Mines Flame Penetration Test #6366 | >30 minutes | 15 seconds | 20 seconds |

[1] The diphenyloxide modified novolac employed in Example 2, having a molecular weight of about 480 and a percent OH of about 9.02.
[2] The reaction product of a 3.5 functional novolac polyol with 1 mole of propylene oxide per OH, said product having an OH equivalent weight of 170.
[3] PAPI is a polymethylene polyphenylisocyanate having an average isocyanate functionality of about 2.6 and an isocyanate equivalent weight of 134.

I claim:
1. A foamed polyurethane product which comprises the reaction product of (1) a diphenyl ether-phenol resin comprising the reaction product of a chloromethylated diphenyl ether having the general formula:

$$\text{CH}_2\text{Cl} \quad \text{-O-} \quad \text{-CH}_2\text{Cl} \quad (\text{CH}_2\text{Cl})_n$$

wherein n is an integer from 0 to 1, and a phenol having at least one hydrogen atom in the ortho or para position and the formula:

$$\text{-OH}$$
$$R$$

wherein R is hydrogen, chlorine, bromine, cyclohexyl, phenyl or an alkyl radical having from 1 to 12 carbon atoms, which resin has a molecular weight between about 450 and 1500; (2) an organic polyisocyanate; (3) a blowing agent consisting of water or a volatile hydrocarbon boiling below 110° C. or a halohydrocarbon boiling below 110° C.; (4) an emulsifying agent; and (5) a catalyst of urethane formation, said polyisocyanate being used in amounts corresponding to from 0.9 to 2.0 NCO group for each OH and active H atoms in the reactive materials.

2. A foamed polyurethane product as claimed in claim 1 wherein the diphenyl ether-phenol resin is the reaction product of chloromethylated diphenyl ether and phenol.

References Cited

UNITED STATES PATENTS

| 2,374,136 | 4/1945 | Rothrock | 260—22 |
| 3,061,559 | 10/1962 | Henson et al. | 260—2.5 |
| 3,128,259 | 4/1964 | Sonnabend | 260—2.5 |
| 3,316,140 | 4/1967 | Sonnabend | 161—198 |
| 3,398,106 | 8/1968 | Hostettler et al. | 260—18 |

OTHER REFERENCES

Product Report "Papi," Bulletin of The Upjohn Company, page 1.
Technical Bulletin-101 entitled "PAPI," cover and page 1 cited.

DONALD E. CZAJA, Primary Examiner

C. W. IVY, Assistant Examiner

U.S. Cl. X.R.

260—2.5 AJ, 2.5 AP, 2.5 AS

UNITED STATES PATENT OFFICE
CERTIFICATE OF CORRECTION

PO-1050
(5/69)

Patent No. 3,650,994         Dated 21 March 1972

Inventor(s) Llewellyn Delphin Booth

It is certified that error appears in the above-identified patent and that said Letters Patent are hereby corrected as shown below:

Column 2, line 10, delete "akyl" and insert --alkyl--.
       line 61, change "2,4-diisocyanatodiphenylether," to --2,4-diisocyanatediphenylether,--.

Column 5, line 66, delete "isocyanae" and insert --isocyanate--.
       line 73, delete "employing" and insert --employed--.

Column 6, in the formula between lines 37 and 41, change "ON" to --OH--.

Signed and sealed this 25th day of July 1972.

(SEAL)
Attest:

EDWARD M. FLETCHER, JR.
Attesting Officer

ROBERT GOTTSCHALK
Commissioner of Patents